(12) United States Patent
Johnston et al.

(10) Patent No.: US 10,251,196 B2
(45) Date of Patent: Apr. 2, 2019

(54) HYBRID MAC PROTOCOL, BASED ON CONTENTION AND RESERVATION, FOR MOBILE AD HOC NETWORKS WITH MULTIPLE TRANSCEIVERS

(71) Applicant: The Boeing Company, Chicago, IL (US)

(72) Inventors: Matthew Johnston, Redondo Beach, CA (US); Ceilidh Hoffmann, London (GB)

(73) Assignee: The Boeing Company, Chicago, IL (US)

( * ) Notice: Subject to any disclaimer, the term of this patent is extended or adjusted under 35 U.S.C. 154(b) by 98 days.

(21) Appl. No.: 15/418,500

(22) Filed: Jan. 27, 2017

(65) Prior Publication Data

US 2018/0220453 A1 Aug. 2, 2018

(51) Int. Cl.
*H04W 74/08* (2009.01)
*H04W 84/18* (2009.01)
*H04W 74/02* (2009.01)
*H04W 74/00* (2009.01)

(52) U.S. Cl.
CPC ....... *H04W 74/0808* (2013.01); *H04W 74/02* (2013.01); *H04W 74/002* (2013.01); *H04W 84/18* (2013.01)

(58) Field of Classification Search
CPC ............... H04W 74/02; H04W 74/002; H04W 74/0808; H04W 84/18; H04W 74/08; H04W 74/0816; H04W 74/0825
See application file for complete search history.

(56) References Cited

U.S. PATENT DOCUMENTS

| 2007/0165695 | A1  | 7/2007 | Gerhardt et al. |
| 2008/0233883 | A1* | 9/2008 | Ibrahim ............ H03L 7/085 455/61 |
| 2010/0046482 | A1  | 2/2010 | Sridhara et al. |
| 2013/0148589 | A1* | 6/2013 | Smith ............ H04W 74/002 370/329 |
| 2014/0269310 | A1  | 9/2014 | Hoffman |

(Continued)

FOREIGN PATENT DOCUMENTS

EP 2051559 A2 4/2009

OTHER PUBLICATIONS

Hoffmann et al., "Method and Apparatus for Wireless Communication in an Electromagnetically Challenged Environment," U.S. Appl. No. 14/958,111, filed Dec. 3, 2015, 38 pages.

*Primary Examiner* — Scott M Sciacca
(74) *Attorney, Agent, or Firm* — Haynes and Boone, LLP (57) ABSTRACT

A mobile ad hoc network communication system is disclosed with a medium access control (MAC) protocol that combines features of contention and reservation to provide a hybrid MAC protocol. Gaining initial access to a channel is achieved using random access, such as a carrier sense multiple access (CSMA) type protocol, in which contention for a channel occurs among users only over available (non-reserved) channels. Once communication between nodes is established over an available channel, the channel is reserved by indicating its use in packet headers, and other users do not attempt transmission over the channel until it is released. Communication on reserved channels does not require backoff or delay, creating a virtual pipe that improves throughput and delay over standard multiple-access protocols.

20 Claims, 7 Drawing Sheets

(56) References Cited

U.S. PATENT DOCUMENTS

2015/0373554 A1* 12/2015 Freda .................. H04W 16/14
                                                    455/450
2017/0201889 A1*  7/2017 ␣McHenry ............. H04W 16/14
2018/0063851 A1*  3/2018 Abraham ............. H04W 72/10

* cited by examiner

| Occupied Channel Table for Node N1 | | | | |
|---|---|---|---|---|
| 1 | 1 | 1 | 0 | 0 |
| Channel Selection Rule Table for Node N1 | | | | |
| Ch1 | Ch2 | Ch3 | Ch4 | Ch5 |
| N2 | N2 | | | |

| Occupied Channel Table for Node N2 | | | | |
|---|---|---|---|---|
| 1 | 1 | 1 | 0 | 0 |
| Channel Selection Rule Table for Node N2 | | | | |
| Ch1 | Ch2 | Ch3 | Ch4 | Ch5 |
| | N3 | N1 | | |

| Occupied Channel Table for Node N3 | | | | |
|---|---|---|---|---|
| 1 | 1 | 0 | 0 | 0 |
| Channel Selection Rule Table for Node N3 | | | | |
| Ch1 | Ch2 | Ch3 | Ch4 | Ch5 |
| N2 | | | | |

|    | c1 | c2 | c3 | c4 | c5 | c6 | c7 |
|----|----|----|----|----|----|----|----|
| N1 | A  | A  | A  | A  | A  | O  | O  |
| N2 | A  | A  | A  | A  | A  | O  | O  |
| N3 | T  | A  | A  | A  | A  | O  | O  |
| N4 | A  | A  | A  | A  | A  | O  | O  |
| N5 | A  | A  | A  | A  | A  | O  | O  |

FIG. 7

|    | c1 | c2 | c3 | c4 | c5 | c6 | c7 |
|----|----|----|----|----|----|----|----|
| N1 | A  | A  | A  | A  | A  | O  | O  |
| N2 | A  | A  | A  | A  | A  | O  | O  |
| N3 | A  | A  | A  | A  | A  | O  | O  |
| N4 | A  | A  | A  | A  | A  | O  | O  |
| N5 | A  | A  | A  | A  | A  | O  | O  |

FIG. 6

|    | c1 | c2 | c3 | c4 | c5 | c6 | c7 |
|----|----|----|----|----|----|----|----|
| N1 | A  | A  | A  | A  | A  | O  | O  |
| N2 | A  | A  | A  | A  | A  | O  | O  |
| N3 | T  | A  | A  | A  | A  | O  | O  |
| N4 | R  | T  | A  | A  | A  | O  | O  |
| N5 | A  | A  | A  | A  | A  | O  | O  |

HYBRID MAC PROTOCOL, BASED ON CONTENTION AND RESERVATION, FOR MOBILE AD HOC NETWORKS WITH MULTIPLE TRANSCEIVERS

TECHNICAL FIELD

The present disclosure relates generally to wireless network communications and, more particularly, to medium access control for mobile ad hoc networks.

BACKGROUND

Network scaling refers to a communication network's ability to provide adequate data throughput to all user devices connected to this network even as user population of the network increases. Providing network scaling for wireless networks can be particularly difficult due to the necessity of sharing a common resource, namely available radio frequency spectrum, generally referred to as radio frequency (RF) bandwidth. Inefficient over-crowding of RF bandwidth among users can, for example, cause excessive mutual interference that degrades the performance of the network. Cellular radio systems have circumvented the scaling problem by geographically dispersing the RF bandwidth used (e.g., frequency re-use among different cells) and by cell splitting (e.g., reduction in the number of users per area sharing the bandwidth). In addition, cellular networks can mitigate the need for scaling by using wireless communication as a final reach (last mile) to users while the network core relies on copper wire, fiber and point-to-point microwave links for backhaul data transport. Such solutions are generally not applicable to mobile ad hoc networks and communications that require direct fast message exchange such as may be useful both commercially and militarily, for example, within a swarm of unmanned aerial vehicles (UAV), automobile-to-automobile or autonomous vehicle networks, sensor networks, robot networks, smart airborne munitions, or soldier-to-soldier networks in a tactical battlefield environment.

Accordingly, there exists a need in the art for scalable and robust communication over very large networks that solves problems of frequency and bandwidth resource sharing among wireless communication devices.

SUMMARY

In one or more embodiments, wireless communication networks, such as mobile ad-hoc networks, are provided with nodes that use multiple transceivers and a hybrid communication protocol. The hybrid communication protocol combines contention and reservation features that allow network nodes to access available channels using the contention aspects of the protocol while at the same time allowing established communication exchanges to be carried out on one or more reserved channels using the reservation aspects of the protocol. A reserved channel is made available again once communication on the reserved channel is completed.

In one or more embodiments, a wireless network communication system includes: a memory that stores, for a network node, information associated with a number of communication channels, such that the information stored for the node includes data indicating whether each communication channel is reserved; and one or more hardware processors in communication with the memory and configured to execute instructions to cause the network communication system to communicate over one or more of the plurality of communication channels by performing operations that include: updating the stored information for the node, based on received data regarding which communication channels are reserved; selecting a channel from the plurality of communication channels, based on the updated information for the node that the channel is not reserved; contending for communication on the selected channel; and in response to communication being established on the selected channel, transmitting data indicating that the selected channel is reserved.

In another embodiment, a method of network communication over a plurality of communication channels is disclosed, including: updating a stored information for a network node, based on received data regarding which communication channels are reserved; selecting a channel from the plurality of communication channels, based on the updated information for the node that the channel is not reserved; contending for communication on the selected channel; and in response to communication being established on the selected channel, transmitting data indicating that the selected channel is reserved.

In still another embodiment, a communication device includes a plurality of transceivers and one or more processors in communication with one or more of the plurality of transceivers, such that the processors are configured to execute instructions to cause the communication device to perform operations including: updating information stored on the communication device, based on received data regarding which communication channels are reserved; selecting an unreserved channel from the plurality of communication channels, based on the updated stored information; contending for communication on the selected channel using at least one of the plurality of transceivers; and, in response to communication being established on the selected channel, transmitting data indicating that the selected channel is now reserved.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

Embodiments of the present disclosure and their advantages may be best understood by referring to the detailed description that follows. It should be appreciated that like reference numerals are used to identify like elements illustrated in one or more of the figures, in which the showings therein are for purposes of illustrating the embodiments and not for purposes of limiting them.

DETAILED DESCRIPTION

To address the need in the art for scalable and robust communication over very large networks and solve various problems of frequency and bandwidth resource sharing among wireless communication devices, network communication is disclosed using a hybrid medium access control (MAC) protocol that combines contention and reservation techniques in a complementary way using network nodes with multiple transceivers for mobile ad-hoc networks. Network communication in accordance with one or more embodiments resolves problems of frequency and bandwidth resource sharing among the wireless communication devices of the network nodes in a way that is especially pertinent to unmanned aerial systems (UAS) running various autonomous protocols in a spectrally congested airspace. Such autonomous protocols may be applicable, for example, to a swarm (e.g., a large number) of unmanned aerial vehicles (UAVs) cooperatively carrying out a specific mission over a geographic area with limited or no human operator intervention. Some example applications include search and rescue and surveillance operations, in both military and commercial scenarios. Thus, the UAV swarm should be capable of receiving mission parameters from a ground station, performing autonomous collaboration among all UAVs in the swarm to carry out the mission, and relaying relevant sensor data across the network and back to a ground station. Embodiments of network communication using the hybrid protocol are applicable both to mobile ad hoc networks and communications that require direct fast message exchange such as may be useful both commercially and militarily, for example, within a swarm of UAVs, automobile-to-automobile or autonomous vehicle networks, sensor networks, robot networks, smart airborne munitions, or soldier-to-soldier networks in a tactical battlefield environment.

According to one or more embodiments, random access and backoff contention techniques are used to gain initial access to one of a multiple number of channels. Such contention only occurs on non-reserved channels, which are considered to be available. Contention may occur on all or any of the available channels. Once communication is established on a channel, data packet headers may be marked indicating that the channel is in use, and no other users will attempt transmission on the reserved channel until it is released (e.g., by transmitting a packet with a header marked indicating that the channel is again available). On the reserved channels, once an existing transmission between nodes is in place, neighboring nodes are alerted of the transmission's spectrum use and can choose from other channels on which to transmit. This allows for extended channel use periods, analogous to channel reservations, to take place without concern of collisions leading to loss of throughput. As a result, messages can be sent sequentially without standard backoff intervals, greatly increasing the attainable throughput and providing reduced latency as well. Such a reservation procedure works in conjunction with using multiple transceivers at each node to make use of multiple channels. Embodiments overcome problems of single channel use such as throughput loss from the control signaling and the fact that extended use from one user would prevent other users from communicating.

Existing standards and protocols, whether commercial or military, do not address the problems of scalability in a way that is capable of scaling, for example, to the size of a UAV swarm. Due to the ad-hoc and highly mobile nature of a typical UAV network, infrastructure-based networking solutions, such as 3G or 4G cellular standards are not applicable for this environment. Additionally, the large propagation delays over a wide-area UAV swarm deployment render time-synchronization for message transmission impractical, limiting the applicability of many time-division multiple access (TDMA) protocols. Consequently, the UAV swarm environment is better suited for random-access protocols, which may embody certain concepts of carrier sense multiple access (CSMA).

The most widely used CSMA MAC layer is based on the IEEE 802.11 standard waveform, used for commercial wireless networks. The 802.11 standard, however, presents several difficulties for use with UAV swarms. For one, the large propagation delays stemming from long-distance aerial links, 802.11 control packets such as acknowledgements (ACKs), request-to-send (RTS) and clear-to-send (CTS) are not appropriate for the swarm environment, as various packets will interfere, and waiting on an RTS/CTS exchange may cause unacceptable delays. As a result, features such as exponential backoff cannot be used, as there is no way to detect collisions (without the control packets) under this simplified 802.11 framework. Moreover, the hidden terminal problem, in which two out-of-range nodes simultaneously transmit to a common neighbor, and are unaware of the contention, is not addressed. This issue is magnified by the fact that in a UAV swarm, hidden terminal scenarios are expected to be prevalent.

By way of contrast, one or more embodiments address these issues, while providing scalability to the UAV swarm level. Furthermore, the scalability of some embodiments can be increased by the inclusion of additional transceivers.

Network scaling or scalability can be particularly difficult to achieve in wireless networks due to the sharing of the common resource of RF bandwidth. If there is over-sharing or if sharing of RF bandwidth among users is inefficient, there can be excessive mutual interference. Cellular radio systems can attempt to circumvent the scaling problem by geographically dispersing the RF bandwidth used (i.e. frequency re-use) and by cell splitting (i.e. reduction in the number of users per area sharing the bandwidth). Moreover, cellular networks use wireless communication as a final reach (last mile) to users while the network core relies on copper wire, fiber optic, and point-to-point microwave links for backhaul data transport. Although military networks typically have a connectivity architecture that is drastically different from a commercial cellular grid, approaches to mitigating scaling problems generally have not been applied as has been done with commercial cellular radio networks.

Even though cellular networks adopt frequency re-use (e.g., use of multiple RF channel sets) for network scaling, each user radio (e.g., network node) is associated at any one time with a single set of RF channels due to the fact that the user radio has a single communication partner (i.e. a base station). In military networks without a permanent, fixed infrastructure, however, the base station concept does not apply, and each user radio tends to have more than one communication partner. Since the user radio can only tune at most to one RF channel set, all neighboring users must time-share the RF channel, resulting in poor frequency re-use and exponential growth of delay in data transport as user population grows.

According to one or more embodiments, a network node (e.g., user radio) is enabled to maintain concurrent communication with its neighbors using more than one RF channel. Each node is equipped with more than one transceiver (transmit-receive pair) unit. Each transceiver unit is tuned to a different RF channel and operates in either transmit or receive mode. By way of contrast, current commercial wireless devices may have multiple radios or transceivers of different types (i.e. multiple air interfaces or waveforms: Bluetooth, WiFi, 4G LTE) whereas the network nodes according to an embodiment runs a single waveform using multiple transceiver units of the same type.

To use the cellular analogy, the method of one embodiment is analogous to a cellular user radio communicating simultaneously with multiple base stations because their cell coverage areas overlap. Unlike a cellular radio, however, the analogous radio may be equipped with multiple transceiver units, with each tuned to a channel used by a different base station. The analogy illustrates two issues that arise: (1) how is an RF channel assigned to a neighbor since it is not a fixed entity like a base station? and (2) how is frequency re-use coordinated among users such that network scaling is achieved?

In one embodiment, there exist multiple RF channels and all user radios compete for access to one or more RF channels. Since each user contends or reserves a channel randomly and independently from a pool of available channels, channel access is scalable. Each node can use a combination of random-access based contention or fixed-access based reservation for RF channel access and communication. For short burst communication, an RF channel is released after the corresponding session is over. For a long communication session, a user informs its neighbors of its captured channel (reserves the channel) to avoid future contention or reservation by others. This feature of one of more embodiments, which allows a user radio to reserve an RF channel over an extended period, does not cause starvation or congestion among other users due to the multi-channel, multi-transceiver communication paradigm. On the application side, in accordance with one or more embodiments, a user can maintain dedicated point-to-point links (e.g. reach-back or air-ground) while still participating in group communication with other users. Thus, by solving the multiple access problem using both contention and reservation techniques, the hybrid MAC protocol can provide a single integrated solution for UAV-to-UAV, UAV-to-Manned Aircraft, and UAV-to-Ground communication, where typically separate stand-alone communication links are required.

Figure 1:
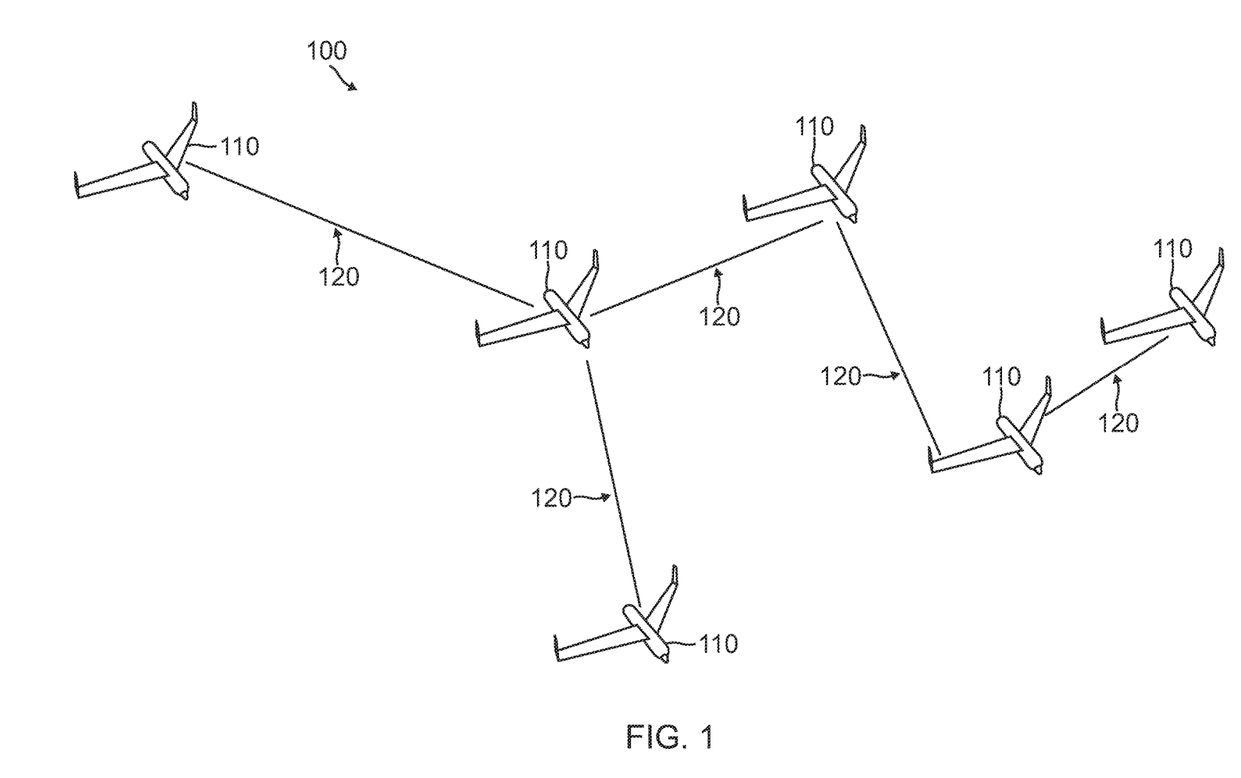
FIG. 1 is a pictorial diagram of a wireless network communication system, in accordance with an embodiment of the disclosure.

FIG. 1 illustrates a wireless network communication system 100, in accordance with an embodiment of the disclosure. System 100 may include any number of network nodes 110, which may communicate with each other wirelessly over network links 120. In the example illustrated in FIG. 1, network nodes 110 are represented by unmanned aerial systems (UAS) or vehicles (UAV). Each node 110 may include a communication device with multiple wireless transceivers and one or more processors, such as illustrated by the example shown in FIG. 9. Thus, each of the links 120 may comprise communication on one or a multiple number of different channels, as shown for example, in FIG. 2; the link communication may be carried out by one or a multiple number of transceivers at each node. Examples of such communication devices and multiple channel communication between nodes are provided by U.S. Patent Publication No. 2014/0269310, filed Apr. 22, 2013, which is incorporated by reference herein in its entirety. The hybrid MAC protocol in accordance with one or more embodiments can run, for example, as a link-layer software application on such a multi-transceiver radio system.

In system 100, the communication device (also referred to as "radio" or "user radio") at one node 110 may be equipped, for example, with five transceiver modules. Other nodes 110 may be equipped with more transceiver modules and other nodes 110 with fewer transceiver modules. In the examples that follow, it may be assumed that each node 110 is equipped with 5 transceivers for convenience in illustrating the several examples. In general, though, radios can be equipped with different transceiver module counts, some more, some less. Each radio's transceiver module may be half-duplex; that is, it can either transmit or receive but not both simultaneously. Each transceiver of a communication device may be configured to operate on any selected channel of the several different communication channels of the shared bandwidth resource as required by operation of the hybrid protocol (e.g., method 400). Thus, given the existence of a large number of channels of the shared bandwidth resource, the number of different channels in simultaneous use by a node 110 may be limited only by the number of transceivers at the node 110. In the examples that follow, channels are referred to using a channel identification (ID) (e.g. 1, 2, 3 . . . ) such that each channel ID has a corresponding RF carrier value and bandwidth. For example, in the WiFi standard, channel ID 1 is 2.412 GHz with 22 MHz bandwidth, and so on. Thus, the examples are applicable to different RF bands and waveforms.

Figure 2:
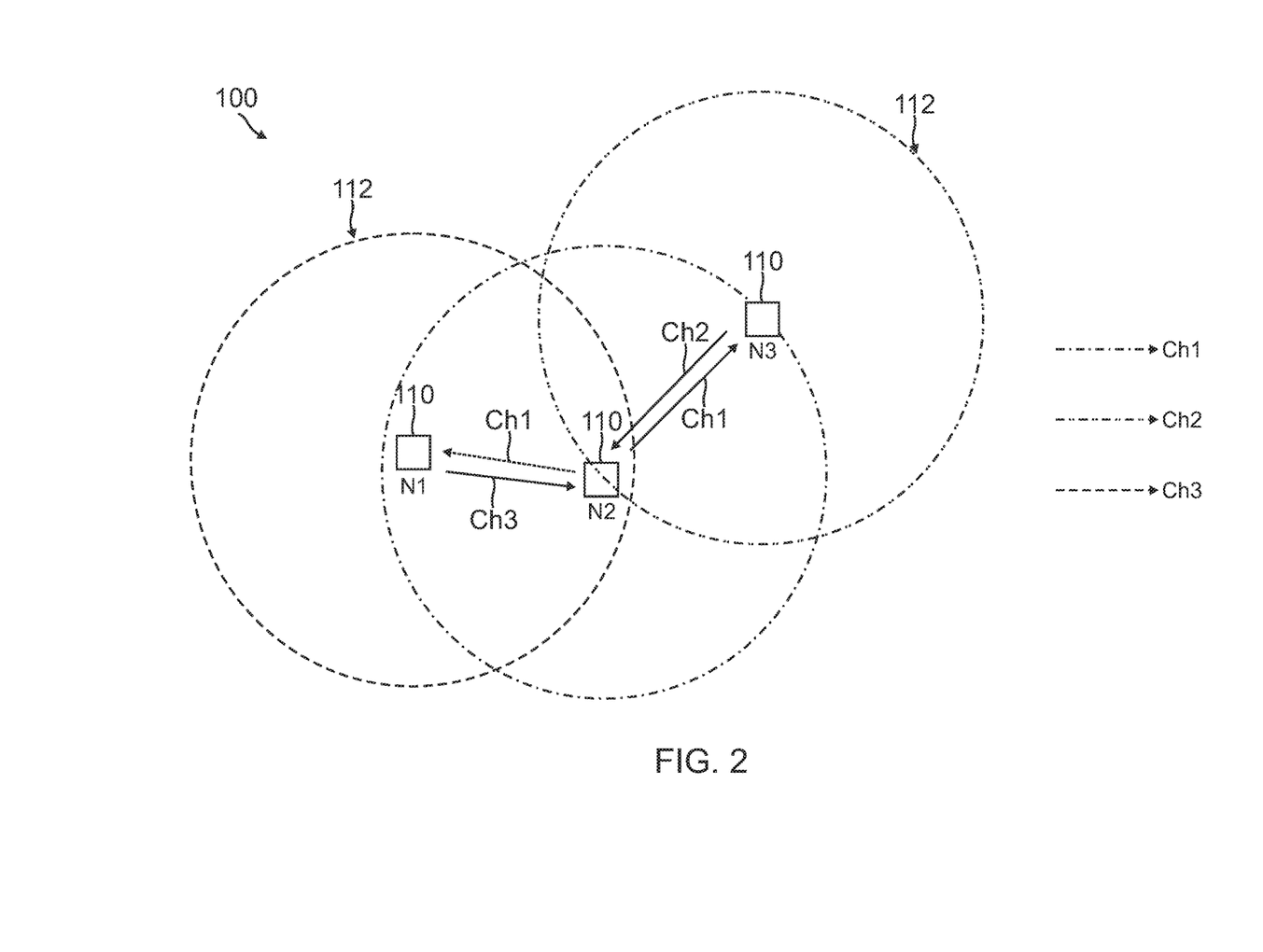
FIG. 2 is an operational diagram of an example of a mobile ad hoc network, in accordance with an embodiment of the disclosure.

FIG. 2 shows a simple example of a mobile ad hoc network embodiment of wireless network communication system 100. FIG. 2 shows a collection of nodes 110 (e.g., nodes N1, N2, N3) of system 100 of FIG. 1 in communication with each other over communication channels 1, 2, and 3. Effective range boundaries 112 indicate that, for this example, while N2 is in communication with both N1 and N3, nodes N1 and N3 are effectively out of range of each other and do not communicate directly with each other.

As illustrated in FIG. 2, when a number of wireless communication devices (e.g., system 100 network nodes N1, N2, N3) are sharing a common set of network resources such as radio frequency channels (e.g., channels 1, 2, and 3), a set of rules (e.g., protocol) governing use of the resources among the devices is necessary. For a communication medium such as RF bandwidth (e.g., channels) shared among communication devices at the network nodes (e.g., N1, N2, N3), the rules for resource sharing can be described systematically and in logical sequence as a medium access control (MAC) protocol. In accordance with one embodiment, the example shown in FIG. 2 pertains to a scenario in which each communication device (e.g., nodes N1, N2, N3) can simultaneously use multiple channels for both transmission and reception of over-the-air radio signals. The problem addressed by one or more embodiments is how these devices collaborate in sharing such resources and still maintain high efficiency in utilization of such resources. As described above with reference to FIG. 1, system 100 is configured to utilize multiple transceivers on each UAV (e.g., nodes N1, N2, N3) to enable different communications on multiple channels simultaneously.

In one embodiment, for example, the multi-channel MAC protocol allows for the attachment of a k-bit header to each transmission, where k is the number of channels accessible to the node. When a node transmits a packet, it sets the i-th bit of the attached packet header to 1 if that node is currently receiving a transmission on channel i, and to 0 otherwise. Additionally, each node maintains a table of used channels (e.g., occupied channel table, see FIG. 3), which is populated through receiving packets from neighboring nodes. When a node attempts to transmit a packet, it chooses a channel that is not shown as occupied, thus is unused or available, in the used channel table, therefore preventing that transmission from interfering with the existing transmissions.

Figure 3:
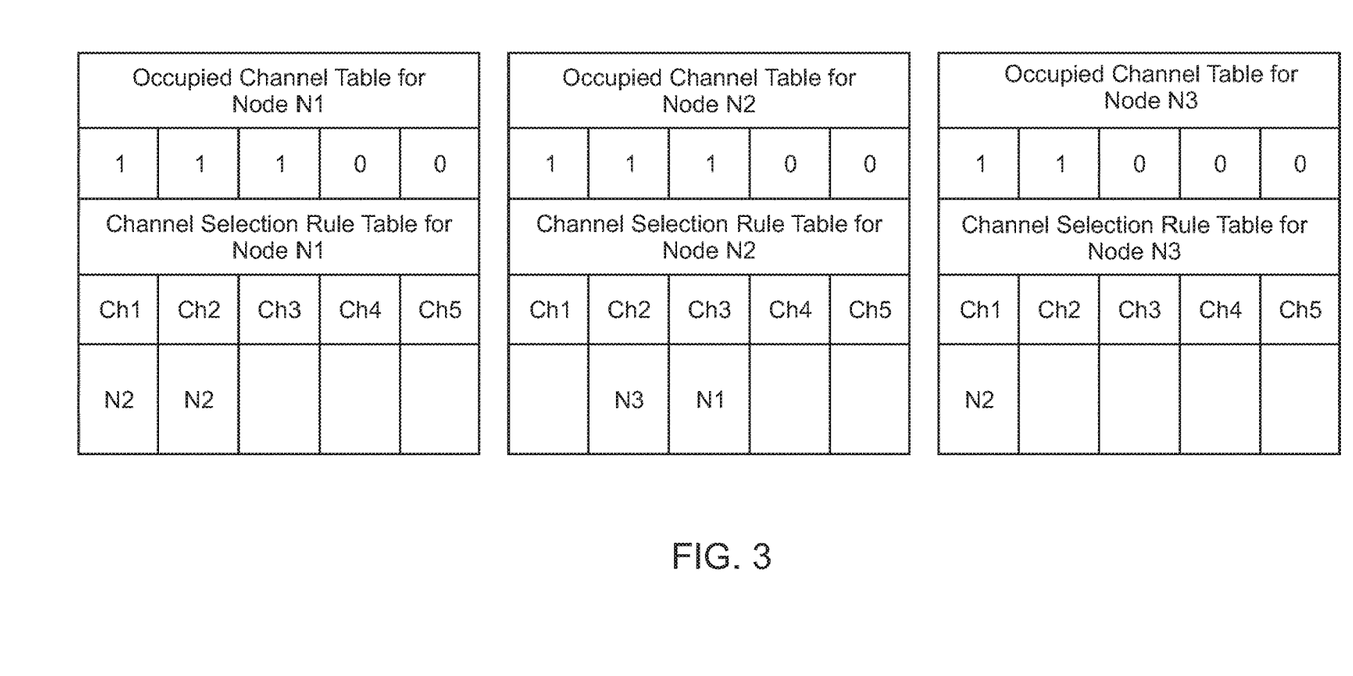
FIG. 3 is a diagram of tables used for operation of the example mobile ad hoc network of FIG. 2, in accordance with an embodiment of the disclosure.

FIGS. 2 and 3 provide a simplified illustration of the foregoing example. In FIG. 2, node N3 transmits a communication to node N2 on channel 2. Node N2 then can simultaneously transmit to node N3 on channel 1. N2's transmission contains a packet header which says that channel 2 is being used. Node N1, which also receives N2's transmission on channel 1 due to the broadcast nature of the wireless medium, will know that channel 2 is being used from the packet header, and channel 1 is being used by node N2. At this point, node N1's occupied channel table appears as shown in FIG. 3. Node N1 may therefore select channel 3 (an unused channel on N1's occupied channel table, which shows channels 3, 4, and 5 unused) on which to transmit, thus avoiding the hidden terminal collisions in this example scenario.

FIG. 3 shows the occupied channel table for each of nodes N1, N2, N3 at a point in time, in the example just presented, after which node N1 has received N2's transmission on channel 1 and just after N2 has received N1's transmission. FIG. 3 also shows examples of each node's channel selection rule table at the same point in time. The channel selection rule table may be used to further refine operation of a method (e.g., method 400) of communicating using a hybrid MAC protocol in accordance with one or more embodiments.

The occupied channel table for a node may be updated as described in the foregoing example. Each node may maintain its own individual occupied channel table and channel selection rule table.

The occupied channel table (OCT) may be described as follows. The occupied channel table for a node lists which channels are occupied with respect to the node at the current time. A channel is occupied with respect to a node if a transmission can be detected on that channel at that node, which may be determined by detecting energy over the particular channel. An occupied channel at one node may not be occupied at another node. As illustrated by the foregoing example, after node N2 receives N1's transmission on channel 3, the occupied channel table of both N2 and N1 may be updated to show channel 3 in use, but at the same time node N3's occupied channel table does not show channel 3 in use because N3 is out of range of N1 as indicated by effective range boundaries 112.

The channel selection rule table (CSRT) may be described as follows. The channel selection rule table for a node lists channels that are in use by neighboring nodes. Each entry of the CSRT is a channel number with a list of neighbors using that channel, as illustrated in FIG. 3. A channel in the CSRT may not be "occupied" by the current node, but may be occupied. For example, as seen in the CSRT for node N2, channel 2 is shown as occupied by N3 and channel 3 is shown as occupied by N1, which are transmitting to N2 on those respective channels, while channel 1 is not shown in N2's CSRT as being occupied by N2 even though channel 1 is shown as occupied in the OCT because N2 is transmitting on channel 1.

Network communication using the occupied channel tables and the channel selection rule tables for each node may be briefly described as follows. A more detailed description is given by the example of method 400 illustrated in FIG. 4. For transmission from a node, the node (e.g., a processor at the node) chooses a channel that is not in the OCT, and not in the CSRT for the node (e.g., an available channel or one not known by the node to be reserved; transmitting over a channel not in the OCT avoids interfering with current transmissions; transmitting over a channel not in the CSRT avoids interfering with transmissions happening at neighboring nodes; in case of multiple available channels, choose one at random using, e.g., a uniform probability distribution). Once access is gained to a channel, the node attaches a k-bit header to data packets of the transmission, for which bit i is marked 1 if the node is receiving packets on channel i (i.e. channel i is in the OCT). In another embodiment, a protocol header such as more fully described below, may be attached to the data packet. Channels marked in the CSRT pertain only to the node itself and, thus, are not conveyed through the k-bit or protocol header. For receptions at a node, all receptions are marked in the OCT, until no more energy is detected. For a received data packet, the header of the packet is checked (e.g., by a processor at the node) and used to update the CSRT. If the packet is addressed to the node, the packet is forwarded to higher layers (e.g., to layers above the MAC layer), and acknowledgement (with protocol header) is sent when the message (of which the packet may be only a portion) is complete.

Figure 4:
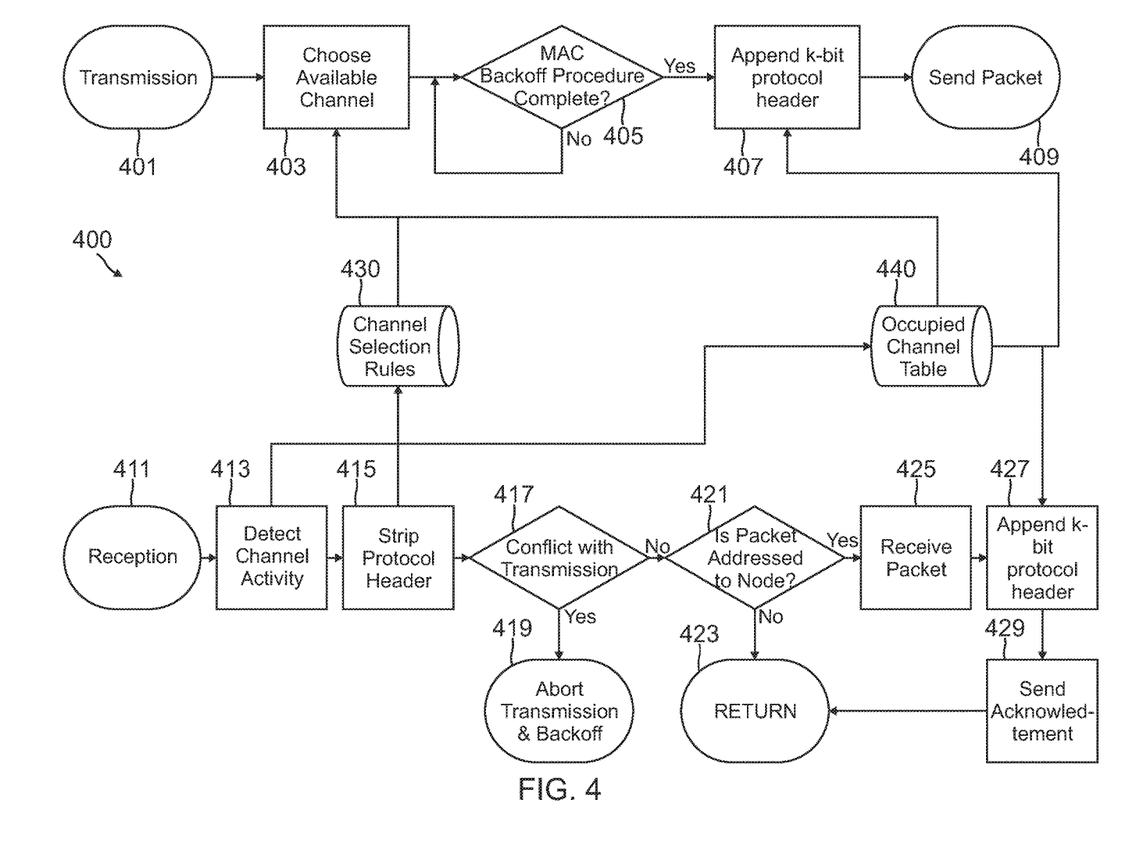
FIG. 4 is a flow diagram illustrating a method of operating a mobile ad hoc network, in accordance with an embodiment of the disclosure.

FIG. 4 illustrates a method 400 of operating a mobile ad hoc network, such as wireless communication system 100, in accordance with an embodiment of the disclosure. Method 400 is organized, for purposes of clarity into a transmission portion, beginning at act 401 and a reception portion beginning at act 411. Because each node of system 100 may include multiple transceivers, however, both transmission and reception portions of method 400 may be performed simultaneously. Moreover, multiple instantiations of method 400 may be occurring simultaneously at a node, depending, for example, on the number of channels the node is simultaneously communicating over. FIG. 4 also illustrates the interaction of method 400 with CSRT 430 and OCT 440.

At act 401 a transmission may begin with a processor at the node providing data to be transmitted, which may include an address or identifier of a network node which is to receive the data. At act 403 an available channel is chosen, using information from CSRT 430 and OCT 440, as shown in FIG. 4. An available channel may generally be regarded as one that is not reserved, as indicated by the CSRT 430 and OCT 440 for the node, and may be chosen in accordance with the examples given above and further examples presented below. At act 405, contention, such as MAC backoff, may be completed for accessing the channel, such as a carrier sense multiple access (CSMA) or exponential backoff procedure. Once contention for channel access is complete, at act 407 a protocol header, such as a k-bit header as described above, or such as a protocol header as described in the examples further presented below, may be attached to the packets of the transmission. As shown in FIG. 4, the protocol header may be prepared using information from OCT 440. At act 409, the transmission of the data with protocol header or headers attached may be performed, for example, by a transmitter of a transceiver module configured to transmit on the selected channel.

At act 411, a reception may begin, for example, by a receiver at the node of a transceiver module configured to receive. At act 413, the receiver may detect channel activity on one or more channels of the shared bandwidth resource. Based on any detected activity, the receiver may update the OCT 440 at the node as shown in FIG. 4. At act 415, strip protocol header, the node may read enough of a received communication to determine relevant information from protocol headers attached to one or more packets of the reception and update the CSRT 430, as shown in FIG. 4. At act 417, the node may use the information from the protocol header to determine whether there is a conflict with transmission taking place, for example, at acts 403, 405, 407, or 409. Examples of such possible conflicts are provided below with reference to FIGS. 5-8. If there is a conflict with the current transmission, the node can abort the transmission and backoff, at act 419, interacting, for example, with acts 403, 405, 407, or 409. At act 421, the node can determine if packets of the reception are addressed to the node; if not, at act 423 method 400 returns to act 411 to continue receiving; but if so, at act 425 the node receives the packet, which may include forwarding the packet to higher layers (e.g., to a processor at the node executing applications). Receiving the packet at act 425 may also include preparing an acknowledgement by appending or attaching a protocol header, using information form OCT 440, as indicated in FIG. 4, at act 427. The acknowledgement may be sent at act 429 on an available channel, e.g., a different channel from that on which the packet was received. Then, at act 423 method 400 returns to act 411 to continue receiving.

Figure 5:
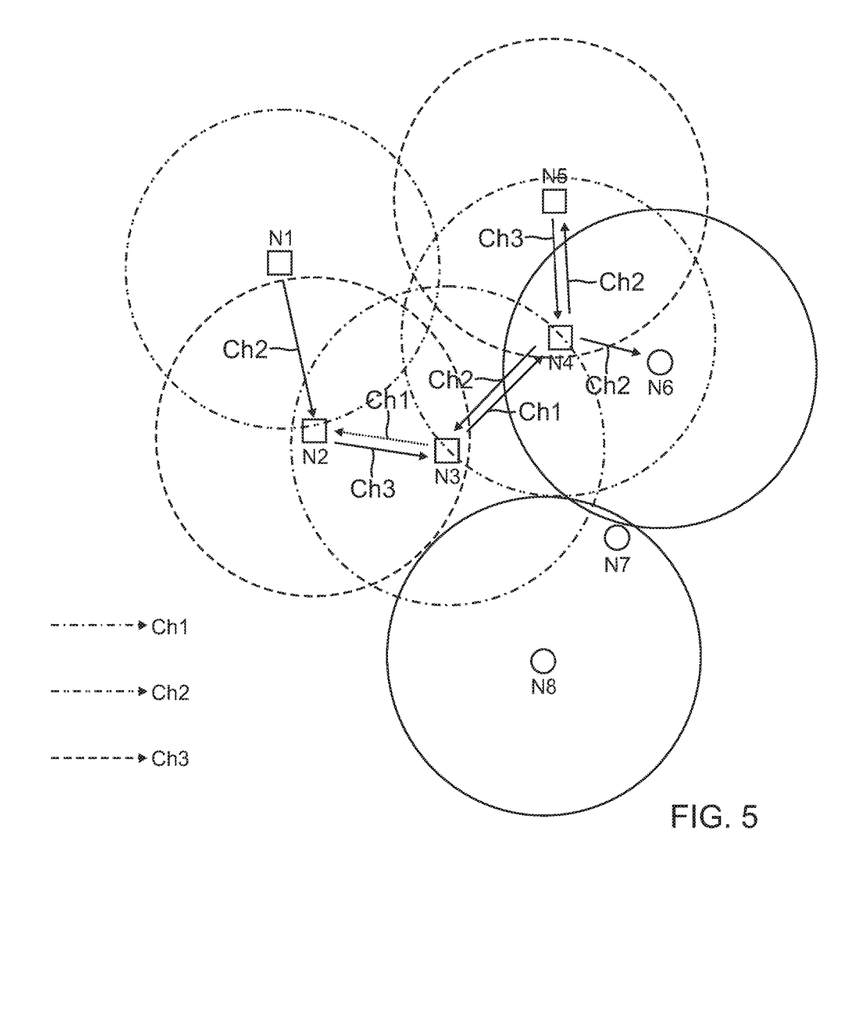
FIG. 5 is a diagram of another example of a mobile ad hoc network, in accordance with an embodiment of the disclosure.

FIG. 5 shows another example of a mobile ad hoc network embodiment of wireless network communication system 100. FIG. 5 is used, in conjunction with FIGS. 6, 7, and 8, to illustrate the following examples of operation of a mobile ad hoc network, such as wireless network communication system 100, in accordance with one or more embodiments. FIG. 5 also illustrates examples of frequency re-use of channel 2, which are simultaneously or concurrently used be nodes N1 and N4, made possible by nodes N1 and N4 being effectively out of range of direct communication with each other, as indicated by the effective range boundary circles. Similarly, channel 3 is re-used (e.g., simultaneously or concurrently used without interference) by nodes N2 and N5 which are also effectively out of range of direct communication with each other. Nodes N7 and N8 illustrate hidden nodes, nodes which are effectively out of range of direct communication with the network of nodes N1-N6, but could join the network of nodes N1-N6 when either comes within range of at least one of those nodes.

Figure 6:
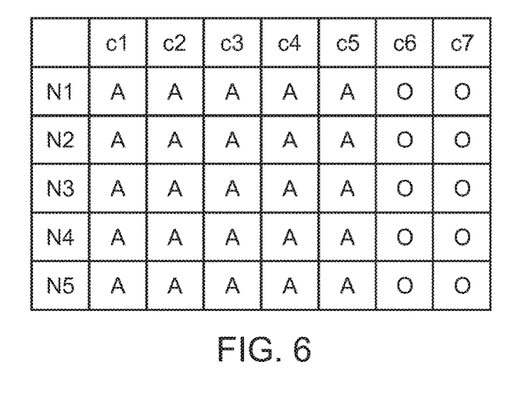
FIG. 6, FIG. 7, and FIG. 8 are diagrams of protocol headers illustrating examples of operation of the mobile ad hoc network of FIG. 5, in accordance with an embodiment of the disclosure.
Figure 7:
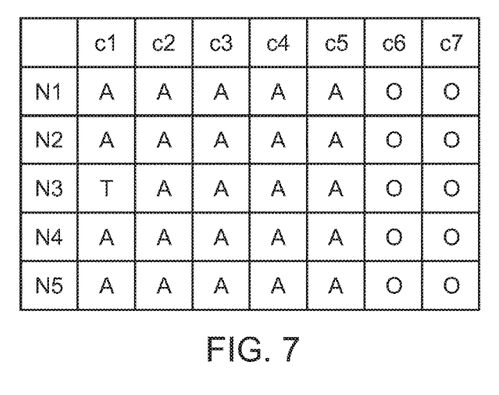
Figure 8:
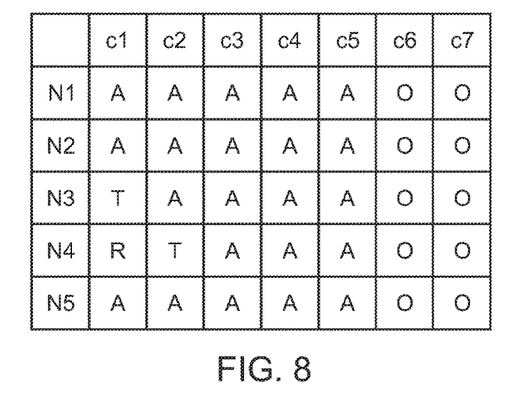

The following example illustrates communication among nodes N1-N6 shown in FIG. 5 according to one embodiment. It is assumed for purposes of illustrating the example, that the radio or each communication device of each node is equipped with 5 transceiver modules, although in general radios can be equipped with different numbers of transceiver modules, some more, some less. It is also assumed for the example that each transceiver operates in half-duplex mode as described above, and that the example starts out with each radio neither transmitting nor receiving. FIGS. 6, 7, and 8 illustrate examples of protocol headers for each of nodes N1-N5 arranged as table for all nodes showing the protocol header that is affixed to transmitted packets by each node at a given point in time. In FIGS. 6, 7, and 8, each row of the table shows the header used by each node, as labeled along the left side of the table. Each column corresponds to a communication channel (e.g., one of channels 1-7) as labeled along the top of the table. The table entries describe the status of each communication channel at each node as follows: A=available for reception; R=actively receiving; U=used for reception, used to convey to other nodes that the node is busy receiving; T=actively transmitting; O=open, having potential for either transmit or receive.

The example starts out with each radio neither transmitting nor receiving, so the protocol headers appear as shown in FIG. 6, all channels are available at all nodes. The example begins with node N3 transmitting to node N4 on channel 1, denoted {1:3→4}. The radio of N3 sends [TAAAAOO] in the header of its transmit (Tx) burst using channel 1. The header table becomes as shown in FIG. 7. Both node N2 and node N4 (which are in signal range of the radio of N3) are listening in on channel 1. They both decode the data frame or packet to read the protocol header. The header has [TAAAAOO] as well as the receiver ID to which the data packet is addressed, in this case receiver ID=N4.

Node N2 discards the data content since it is not the rightful recipient but logs channel use information from radio N3, e.g., by using the protocol header [TAAAAOO] to update node N2's OCT and CSRT to reflect N3's use of channel 1. Node N4 responds to N3 (e.g., either by acknowledgment of reception or by transmission of its own data). N4 chooses to transmit on channel 2 to radio N3, {2:4→3}. The radio of N4 sends [RTAAAOO] in the header of its transmit (Tx) burst using channel 2. The header table becomes as shown in FIG. 8.

There are now three possible outcomes:
1) N3 sends another Tx burst to N4 on channel 1, {1:3→4}, in which it updates its header to [TRAAAOO], reflecting use of channel 2 by node N3.
2) N2 sends to N3 using channel 2: {2:2→3}.
3) Both radio 2 and 4 use channel 2 and their Tx bursts overlap: {2:2→3} and {2:4→3}.

In the first outcome, N2 becomes aware of channel 2 use by N3. N2 avoids both channel 1 and channel 2. Thus, N4 has reserved use of channel 2.

In the second outcome, {2:2→3} is successful because N 4 was silent (not transmitting) at the same time. But since N3 has already accepted transmission from N4 on channel 2, N3 tells N2 to back off from channel 2 by sending its Tx burst with protocol header [TUAAAOO] with receiver ID=N2. With this information, N2 will use another channel for transmission to N3, e.g., channel 3 as shown in FIG. 5.

In the third outcome, Tx bursts from N2 and N4 overlap, and the likely result is data corruption. There is a possibility that one of N2 and N4 will win out and get through. In that case, we have either successful {2:2→3}, which is the second outcome, or successful {2:4→3} as described above. But assume there is collision and data corruption. Neither N2 nor N4 will receive acknowledgment from N3. N2 and N4 will both back off and try again unless N3 sends a Tx burst to N4 with [TRAAAOO], which N2 receives and avoids channel 2 (e.g., first or second outcome eventually applies).

Another example illustrates the "open" channel case, e.g., use of "O" entries in the protocol header tables. For whatever reason, if a radio wants to jump or expand to another channel—for example, N3 wants to expand from channel 1 to channel 7 to transmit to N4—N3 can send the following header: [TRAAAOT] using both channel 1 and channel 7 Tx bursts. With this information, N4 can reconfigure its transceiver modules. For example, N4's five transceiver modules may have been tuned as follows: Module 1: transmit on channel 1; Module 2: receive on channel 2; Modules 3, 4, 5:

active mode to receive on channels 3, 4, and 5. N4 may now reconfigure transceiver module 5 to receive on channel 7. N4's protocol header becomes [RTAAOOR]. Modules 3 and 4 of N4 may remain in active receive mode for channels 3 and 4.

A further example illustrates the case of channel release. If node N3 has nothing more to send to N4, N3's protocol header for its final Tx burst to N4 is [ARAAAOO] (compared to previously [TRAAAOO]). The radio (communication device) of every node within range (e.g., N2 and N4) become aware that channel 1 is now available for transmit or receive. N3 may configure one of its transceiver modules to be in active receive mode for channel 1.

Figure 9:
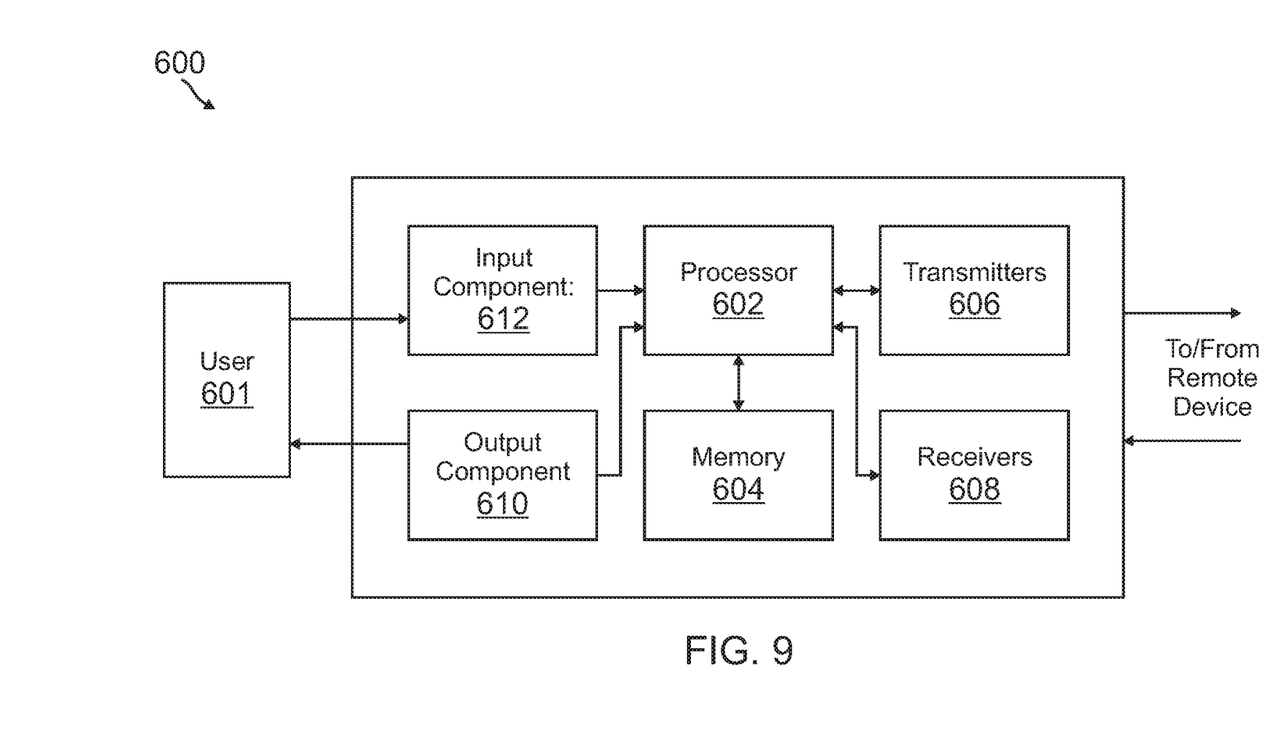
FIG. 9 is a block system diagram of an example of a node of a wireless network communication system forming an ad hoc mobile network, in accordance with an embodiment of the disclosure.

FIG. 9 is a block system diagram of an example of a node 600 of a wireless network communication system forming an ad hoc mobile network, such as system 100, in accordance with an embodiment of the disclosure. In one embodiment, node 600 may provide a generalized example of a node 110 of wireless network communication system 100. In one embodiment, node 600 includes a processor 602, a memory device 604 coupled to processor 602, one or more wireless transmitters 606, one or more wireless receivers 608, an output component 610, and an input component 612.

Processor 602 may include, for example, one or more microcontrollers, microprocessors, reduced instruction set circuits (RISC), application specific integrated circuits (ASIC), programmable logic circuits (PLC), field programmable gate arrays (FPGA), or any other circuit capable of executing the functions described.

Memory device 604 may include a non-transitory computer readable storage medium, such as a random access memory (RAM), flash memory, a hard disk drive, a solid state drive, a diskette, a flash drive, a compact disc, a digital video disc, and/or any suitable memory. For example, memory device 604 may include data or instructions embodying aspects of the disclosure that are executable by processor 602 (e.g., processor 602 may be programmed by the instructions) to enable processor 602 to perform the functions described. Additionally, the memory device 604 may comprise an operating system and applications.

Wireless transmitters 606 may be configured as part of multiple transceiver modules to transmit communication signals over wireless network 100. In one embodiment, wireless transmitters 606 may transmit in a radio frequency spectrum and operate using the communication protocols described. Each wireless transmitter 606 may be configured to transmit on various radio frequency channels. In some embodiments, one or more of wireless transmitters 606 are configured to transmit in a different frequency spectrum or communication protocol from others of the transmitters 606.

Wireless receivers 608 may be configured as part of multiple transceiver modules to receive communication signals over wireless network 100. In one embodiment, wireless receivers 608 may receive signals on a radio frequency spectrum and operate using the communication protocols described. Each wireless receiver 608 may be configured to receive signals on various radio frequency channels. In other embodiments, one or more of wireless receivers 608 may be configured to receive on a different frequency spectrum or communication protocol from others of the receivers 608.

Node 600 may also include at least one output component 610 for presenting information to a user 601. Output component 610 may be any component capable of conveying information to user 601. In some implementations, output component 610 includes an output adapter such as a video adapter or an audio adapter, for example. An output adapter may be operatively coupled to processor 602 and configured to be operatively coupled to an output device such as a display device (e.g., a liquid crystal display (LCD), organic light emitting diode (OLED) display, cathode ray tube (CRT), or "electronic ink" display) or an audio output device (e.g., a speaker, or headphones). In some implementations, at least one such display device or audio device is included with output component 610.

Node 600 may include at least one input component 612 for receiving input from user 601. Input component 612 may include, for example, a keyboard, a pointing device, a mouse, a stylus, a touch sensitive panel (e.g., a touch pad or a touch screen), a gyroscope, an accelerometer, a position detector, an audio input device, or data interface to another device. A single component such as a touch screen may function as both an output device of output component 610 and input component 612. In some implementations, either or both of output component 610 or input component 612 may include an adapter for communicating data or instructions between node 600 and a computer or other device.

Embodiments of network communication using the hybrid protocol are applicable both to mobile ad hoc networks and communications that require direct fast message exchange such as may be useful both commercially and militarily, for example, within a swarm of UAVs, automobile-to-automobile or autonomous vehicle networks, sensor networks, robot networks, smart airborne munitions, or soldier-to-soldier networks in a tactical battlefield environment.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A wireless network communication system comprising:
   a non-transitory memory storing, for a network node, information associated with a plurality of communication channels, wherein the information stored for the node includes data indicating whether the communication channels are reserved; and
   one or more hardware processors in communication with the memory and configured to execute instructions to cause the system to communicate over one or more of the plurality of communication channels by performing operations comprising:
      updating the information stored for the node, based on received data regarding which communication channels are reserved;
      selecting a channel from the plurality of communication channels, based on the updated information for the node that the channel is not reserved;
      contending for communication on the selected channel; and
      in response to communication being established on the selected channel, transmitting data indicating that the selected channel is reserved;
   wherein the information stored for the node comprises an occupied channel table that indicates that a channel of the plurality of communication channels is occupied based on detecting energy on that channel at the node, and the selecting comprises selecting a channel that is not occupied at the node, based on the occupied channel table;

wherein the information stored for the node comprises a channel selection rule table that indicates whether a channel is in use by a neighboring node, excluding channels in use by the node, and the selecting comprises selecting a channel that is not in use by a neighboring node, based on the channel selection rule table; and wherein the transmitted data comprises a k-bit header comprising a plurality of bits configured to identify a number of channels accessible by the node, wherein each bit of the k-bit header is associated with a corresponding one of the channels, and wherein the bit associated with the channel that the node is receiving the communication on is marked indicating the channel is in use.

2. The system of claim 1, further comprising, in response to communicating on the selected channel being completed, transmitting data indicating that the channel is available.

3. The system of claim 1, further comprising, in response to communicating on the selected channel being completed, updating the information stored for the node to indicate that the selected channel is not reserved.

4. The system of claim 1, wherein the node comprises a plurality of radio transceivers.

5. The system of claim 1, further comprising transmitting data indicating which channels are occupied at the node based on the occupied channel table.

6. The system of claim 1, wherein updating the information stored for the node comprises updating the occupied channel table to indicate that a channel is occupied at the node in response to the node receiving a communication on that channel.

7. The system of claim 1, further comprising a protocol header attached to the data configured to provide a current status of each of the communication channels at the node, wherein the status of the channels at the node comprises: channels available for reception, channels actively receiving, channels used for reception, channels actively transmitting, and/or channels open for communication.

8. The system of claim 1, wherein updating the information stored for the node comprises updating the channel selection rule table to indicate that a channel is in use by a neighboring node.

9. The system of claim 1, wherein selecting a channel that is not reserved comprises selecting at random from among available channels of the plurality of communication channels that are not reserved.

10. The system of claim 1, wherein contending for communication on the selected channel comprises using a backoff procedure.

11. A method of network communication over a plurality of communication channels, comprising:
updating a stored information for a network node, based on received data regarding which communication channels are reserved;
selecting a channel from the plurality of communication channels, based on the updated information for the node that the channel is not reserved;
contending for communication on the selected channel; and
in response to communication being established on the selected channel, transmitting data indicating that the selected channel is reserved;
wherein the updating comprises updating information for the node with an occupied channel table that indicates that a channel of the plurality of communication channels is occupied based on detecting energy on that channel at the node, and selecting a channel that is not reserved comprises selecting a channel that is not occupied at the node, based on the occupied channel table;
wherein the updating comprises updating information for the node with a channel selection rule table that indicates whether a channel is in use by a neighboring node, excluding channels in use by the node, and selecting a channel that is not reserved comprises selecting a channel that is not in use by a neighboring node, based on the channel selection rule table; and
wherein the transmitted data comprises transmitting a k-bit header comprising a plurality of bits configured to identify a number of channels accessible by the node, wherein each bit of the k-bit header is associated with a corresponding one of the channels, and wherein the bit associated with the channel that the node is receiving the communication on is marked indicating the channel is in use.

12. The method of claim 11, further comprising, in response to communicating on the selected channel being completed, transmitting data indicating that the channel is available.

13. The method of claim 11, further comprising, in response to communicating on the selected channel being completed, updating the stored information for the node to indicate that the selected channel is not reserved.

14. The method of claim 11,
wherein the node comprises a plurality of radio transceivers.

15. The method of claim 11, further comprising
transmitting a current status of each of the communication channels at the node, wherein the status of the channels at the node comprises: channels available for reception, channels actively receiving, channels used for reception, channels actively transmitting, and/or channels open for communication.

16. The method of claim 11, wherein selecting a channel that is not reserved comprises selecting at random from among available channels of the plurality of communication channels that are not reserved.

17. The method of claim 11, wherein contending for communication on the selected channel comprises using a backoff procedure.

18. The method of claim 11, further comprising transmitting data indicating which channels are occupied at the node based on the occupied channel table.

19. The method of claim 11, wherein updating the stored information for the node comprises updating the occupied channel table to indicate that a channel is occupied at the node in response to the node receiving a communication on that channel.

20. A communication device comprising a plurality of transceivers and one or more processors in communication with one or more of the plurality of transceivers, wherein the processors are configured to execute instructions to cause the communication device to perform operations comprising:
updating information stored on the communication device, based on received data regarding which one or more of a plurality of communication channels are reserved;

selecting a channel from the plurality of communication channels, based on the updated stored information, wherein the selected channel is not reserved;

contending for communication on the selected channel using at least one of the plurality of transceivers; and in response to communication being established on the selected channel, transmitting data indicating that the selected channel is reserved;

wherein the updating comprises updating information for the communication device with an occupied channel table that indicates that a channel of the plurality of communication channels is occupied based on detecting energy on that channel at the communication device, and selecting a channel comprises selecting a channel that is not occupied at the communication device, based on the occupied channel table;

wherein the updating comprises updating information for the communication device with a channel selection rule table that indicates whether a channel is in use by a neighboring communication device, excluding channels in use by the communication device, and selecting a channel comprises selecting a channel that is not in use by a neighboring communication device, based on the channel selection rule table; and wherein the transmitted data comprises transmitting a k-bit header comprising a plurality of bits configured to identify a number of channels accessible by the communication device, wherein each bit of the k-bit header is associated with a corresponding one of the channels, and wherein the bit associated with the channel that the communication device is receiving the communication on is marked indicating the channel is in use.

* * * * *